US012000952B2

(12) United States Patent
Findenig et al.

(10) Patent No.: US 12,000,952 B2
(45) Date of Patent: Jun. 4, 2024

(54) MODULAR SEQUENCER FOR RADAR APPLICATIONS

(71) Applicant: Infineon Technologies AG, Neubiberg (DE)

(72) Inventors: Rainer Findenig, Linz (AT); Bernhard Greslehner-Nimmervoll, Hagenberg (AT)

(73) Assignee: Infineon Technologies AG, Neubiberg (DE)

( * ) Notice: Subject to any disclaimer, the term of this patent is extended or adjusted under 35 U.S.C. 154(b) by 316 days.

(21) Appl. No.: 16/949,251

(22) Filed: Oct. 21, 2020

(65) Prior Publication Data
US 2022/0120852 A1    Apr. 21, 2022

(51) Int. Cl.
*G01S 7/35*  (2006.01)
*G06F 5/06*  (2006.01)
*G06F 13/16* (2006.01)

(52) U.S. Cl.
CPC .................. *G01S 7/35* (2013.01); *G06F 5/06* (2013.01); *G06F 13/1673* (2013.01); *G06F 13/1689* (2013.01)

(58) Field of Classification Search
CPC .......... G01S 7/35; G06F 5/06; G06F 13/1673; G06F 13/1689
See application file for complete search history.

(56) References Cited

U.S. PATENT DOCUMENTS

| | | | | |
|---|---|---|---|---|
| 8,781,292 B1* | 7/2014 | Ross | ..................... | H04N 7/181 |
| | | | | 386/223 |
| 10,509,104 B1* | 12/2019 | Dato | ...................... | G01S 7/032 |
| 2002/0034248 A1* | 3/2002 | Chen | ..................... | H04N 19/33 |
| | | | | 375/E7.079 |
| 2004/0028123 A1* | 2/2004 | Sugar | .................... | H04L 1/1664 |
| | | | | 375/224 |
| 2017/0092236 A1* | 3/2017 | Tripathi | ................ | G06F 3/1407 |
| 2018/0372843 A1* | 12/2018 | Greslehner-Nimmervoll | ............. | |
| | | | | G01S 7/4056 |
| 2019/0146058 A1* | 5/2019 | Roger | .................... | G01S 7/023 |
| | | | | 342/175 |
| 2019/0230420 A1* | 7/2019 | Negishi | ............. | H04N 21/2362 |
| 2019/0303042 A1* | 10/2019 | Kim | ...................... | G06F 3/0659 |

* cited by examiner

*Primary Examiner* — Timothy A Brainard
*Assistant Examiner* — Ismaaeel A. Siddiquee
(74) *Attorney, Agent, or Firm* — Harrity & Harrity, LLP

(57) ABSTRACT

A radar device may include a memory to store a program associated with operating the radar device. The radar device may include a decoder to read the program from the memory, and generate a control value and a timestamp based at least in part on the program. The control value may be a value to be provided as an input to a component of the radar device at a time indicated by the timestamp. The radar device may include a first-in first-out (FIFO) buffer to store at least the control value and provide the control value as the input to the component of the radar device at the time indicated by the timestamp.

20 Claims, 15 Drawing Sheets

MODULAR SEQUENCER FOR RADAR APPLICATIONS

BACKGROUND

A radar application, such as an automotive frequency-modulated continuous-wave (FMCW) application, may rely on transmitting frequency sweeps (also referred to as frequency ramps), where a given frequency ramp is defined by a start frequency, a stop frequency, and a duration (e.g., a period of time over which the frequency changes). In operation, multiple frequency ramps are concatenated and repeated to form a so-called frequency ramp scenario for use in the radar application. In addition to generation of frequency ramps, other on- and off-chip functions (e.g., transmit channels, analog-to-digital converters (ADCs), monitoring components, power amplifiers, or the like) and also value settings (e.g., low- and high-pass corner frequency) need to be controlled synchronously to the frequency ramps.

SUMMARY

In some implementations, a radar device includes a memory to store a program associated with operating the radar device; a decoder (e.g., implemented in hardware and/or in software) to read the program from the memory and generate a control value and a timestamp based at least in part on the program, wherein the control value is a value to be provided as an input to a component of the radar device at a time indicated by the timestamp; and a first-in first-out (FIFO) buffer to store at least the control value and provide the control value as the input to the component of the radar device at the time indicated by the timestamp.

In some implementations, a method includes reading a program from a memory of a radar device; generating a control value and a timestamp based at least in part on the program, wherein the control value is a value to be provided as an input to a component of the radar device at a time indicated by the timestamp; storing the control value in a FIFO buffer associated with the component; and providing the control value as the input to the component at the time indicated by the timestamp.

In some implementations, a system includes a decoder to obtain a program associated with controlling radar operation of a set of components of the system, and generate a value pair based at least in part on the program, the value pair including a control value associated with a component of the set of components and a timestamp corresponding to the control value; and a FIFO buffer to determine that a time indicated by a global timer associated with the system matches the time indicated by the timestamp, and provide the control value to the component based on the determination that the time indicated by the global timer matches the time indicated by the timestamp.

DETAILED DESCRIPTION

The following detailed description of example implementations refers to the accompanying drawings. The same reference numbers in different drawings may identify the same or similar elements.

Figure 1A:
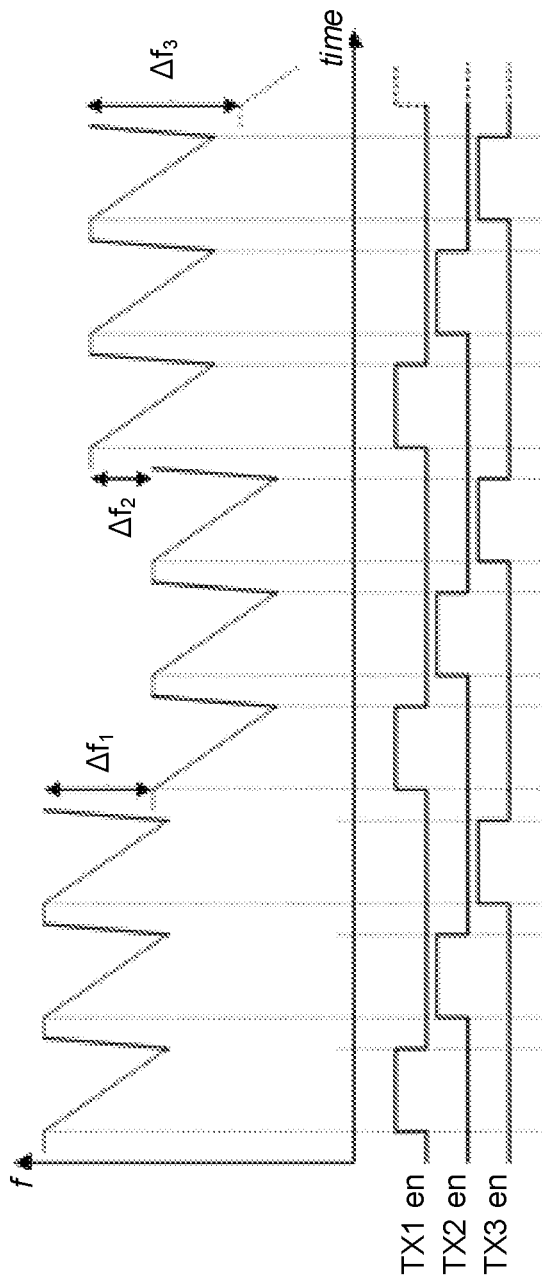
FIG. 1A is a diagram illustrating an example frequency ramp scenario.

Some applications, such as an advanced driver assistance system (ADAS) application, require the ability to define complex frequency ramp scenarios. These complex frequency ramp scenarios are typically based on the repetition of basic frequency ramp building blocks, while changing details in the configuration of the building blocks in a given segment of the frequency ramp scenario. FIG. 1A is a diagram illustrating an example frequency ramp scenario in which three frequency ramp segments enable different transmit (TX) channels (e.g., TX1, TX2, TX3) before the same sequence is repeated with a frequency offset (e.g., $\Delta f_1$, $\Delta f_2$, $\Delta f_3$). Note that the execution of the example frequency ramp scenario may require various control signals, such as the TX enable signals shown in the lower portion of FIG. 1A (e.g., TX1 en, TX2 en, TX3 en). These control signals must be switched in cycle-accurate timing (e.g., accurate to one digital clock cycle) both with respect to each other and with respect to the execution of the frequency ramps.

Typically, a configuration for a sequence of frequency ramps that form a frequency ramp scenario (herein referred to as sequence configuration data) is stored in one or more flip-flops and/or a memory of a radar device (e.g., a monolithic millimeter-wave integrated circuit (MMIC)). For example, a configuration for a set of prototype chirps may be stored in a set of flip-flops of the radar device, and additional memory (e.g., another set of flip-flops, a random access memory (RAM), or the like) may store configurations for deltas to the set of prototype chirps, where a delta defines another chirp by indicating a difference from one of the set of prototype chirps. To reduce overall system cost, memory-efficient approaches of storing such sequence configuration data have been utilized. These approaches include, for example, loops, indirect data accesses, and other optimizations to compress the sequence configuration data as much as possible. As a result of these approaches, the sequence configuration data is in some cases implemented by means of so-called "opcodes" that can be interpreted by a unit in the radar device. Such opcodes might include code that causes, for example, a ramp segment to be executed with a start frequency f, slope $\Delta f$, and a configuration c, where c may include, for example, information that identifies a set of TX channels to be enabled. In this example, the opcodes could further include code that causes the start frequency f to be offset for all subsequent frequency ramp segments, and code that causes a set of other opcodes to be executed in a loop. A combination of such opcodes allows a scenario such as that shown in FIG. 1A to be efficiently implemented by the radar device.

Figure 1B:
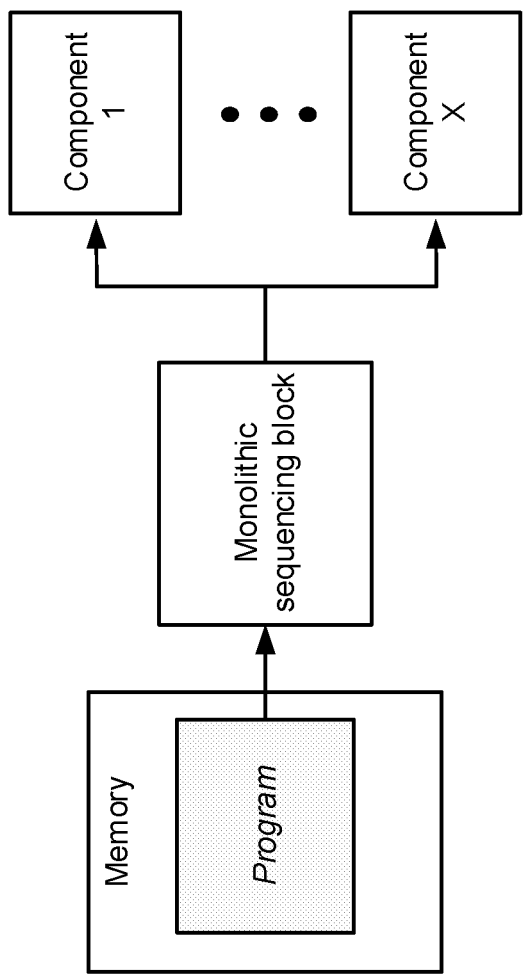
FIG. 1B is a diagram illustrating a conventional implementation of a monolithic sequencing block in a radar device.

Some conventional implementations are built in a monolithic fashion in which a single hardware block of the radar device reads the opcodes associated with the sequence configuration data, resolves any loops, resolves indirect data accesses, determines a point in time when a frequency ramp segment should start, and applies all configurations associated with the frequency ramp segment in the system at that point in time. These steps are repeated for a next opcode until all opcodes are processed. A conventional implementation of a monolithic sequencing block that performs tasks in this manner is shown in FIG. 1B. In operation, the conventional monolithic sequencing block reads the opcodes associated with the sequence configuration data from a memory of the system (identified as a program in FIG. 1B), interprets the opcodes as described above, and directly drives inputs (e.g., enables inputs or configuration inputs, such as a gain, a cutoff frequency, a decimation rate setting, or the like) of components to be controlled (e.g., component 1 through component X) based on the opcodes. As noted above, these operations must be performed in a cycle-accurate manner (i.e., under hard real-time constraints) to ensure acceptable performance of the radar device.

As noted above, the requirement for the sequence configuration data to be interpreted and executed in lock-step imposes hard real-time requirements on the radar device. For example, because a length of a frequency ramp segment can be as low as a few hundred nanoseconds, the monolithic sequencing block is generally implemented purely in hardware. However, while implementation in hardware allows these stringent timing requirements to be satisfied, there are a number of drawbacks to this approach. One such drawback is that the monolithic structure of the sequencing block hardware increases an amount of effort with respect to both design and verification of the monolithic sequencing block. The absence of natural boundaries within the monolithic sequencing block also complicates distributing the implementation between different engineers during design. Another drawback is that the monolithic sequencing block hardware is fixed at tape-out, meaning that any bug fixes or late feature requests are difficult or even impossible to implement. Still another drawback is that even though the dedicated hardware may process data quickly, a number of RAM accesses for reading a single frequency ramp segment may be high (e.g., in the range of 10 to 20 accesses), which imposes a lower bound with respect to a length of a frequency ramp segment.

Figure 1C:
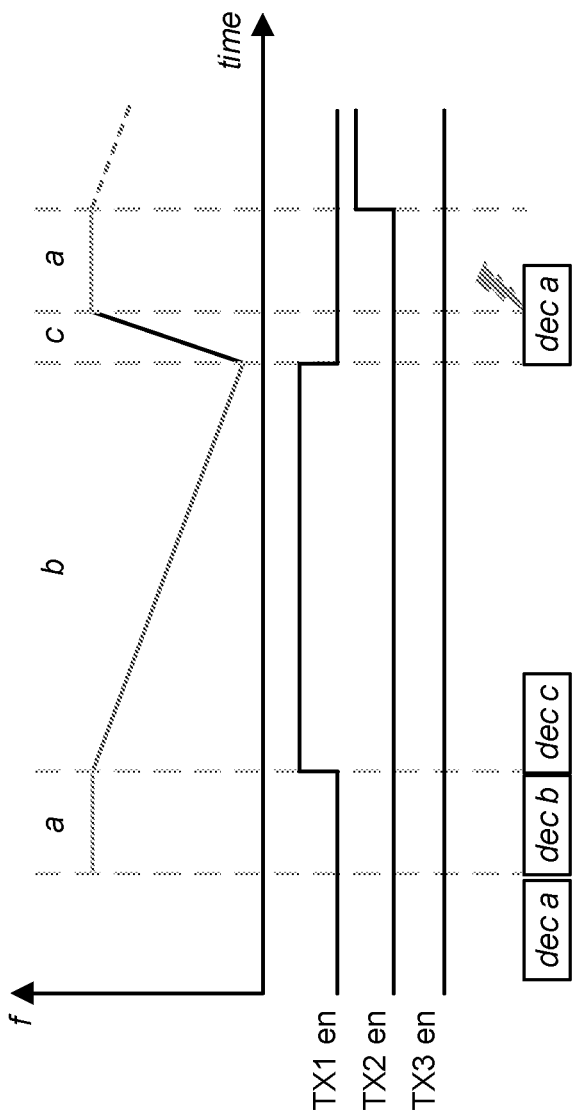
FIG. 1C illustrates an example of a lower bound being needed for a length of a frequency ramp segment when using the conventional implementation of the monolithic sequence block shown in FIG. 1B.

FIG. 1C illustrates an example of a lower bound being needed for a length of a frequency ramp segment when using the conventional implementation of a monolithic sequencing block such as that shown in FIG. 1B. In FIG. 1C, a decoding time (e.g., a time needed for the monolithic sequencing block to decode a portion of the program associated with a particular segment of a frequency ramp) is identified as dec X, where X is the frequency ramp segment to be decoded. In the example shown in FIG. 1C, since decoding frequency ramp segment a takes longer than executing frequency ramp segment c, frequency segment a cannot be started in time for the second frequency ramp, which violates the hard real-time requirements described above. In practice, configurations applied in lock-step with the frequency ramp segments, such as the TX enable signals shown in the lower portion of FIG. 1C, can be delayed with respect to a start of a frequency ramp segment or can even be applied before the start of the frequency segment (e.g., by being "delayed" by a negative number of cycles). However, since different configurations might be delayed differently, this significantly complicates the design of this monolithic sequencing block because all delays need to be handled in parallel.

Some implementations described herein provide a radar device with a sequencer in which functionality is split between a decoder and a set of first-in first-out (FIFO) buffers. In some implementations, the decoder reads a program (e.g., a set of opcodes associated with operating the radar device) from a memory of the radar device, and generates a control value and a timestamp based at least in part on the program. Here, the control value is a value that is to be provided as an input to a component of the radar device at a time indicated by the timestamp. The control value (and, optionally, the timestamp) are stored by a FIFO buffer associated with the component, and the FIFO buffer provides the control value as the input to the component of the radar device at the time indicated by the timestamp. Additional details are provided below.

This split of sequencer functionality between the decoder and the set of FIFO buffers provides a natural decomposition of the conventional monolithic sequencer block. In practice, the use of control values and their associated timestamps enable an amount of functionality that has to fulfill hard real-time requirements, and therefore that has to be implemented in hardware, to be minimized. As a result, a significant amount of sequencer functionality can be implemented in software, thereby reducing complexity of design of the radar device, while also improving flexibility (e.g., for late changes, bug fixes, reconfigurations, or the like), even after tape-out or when the radar device is in field.

Figure 2A:
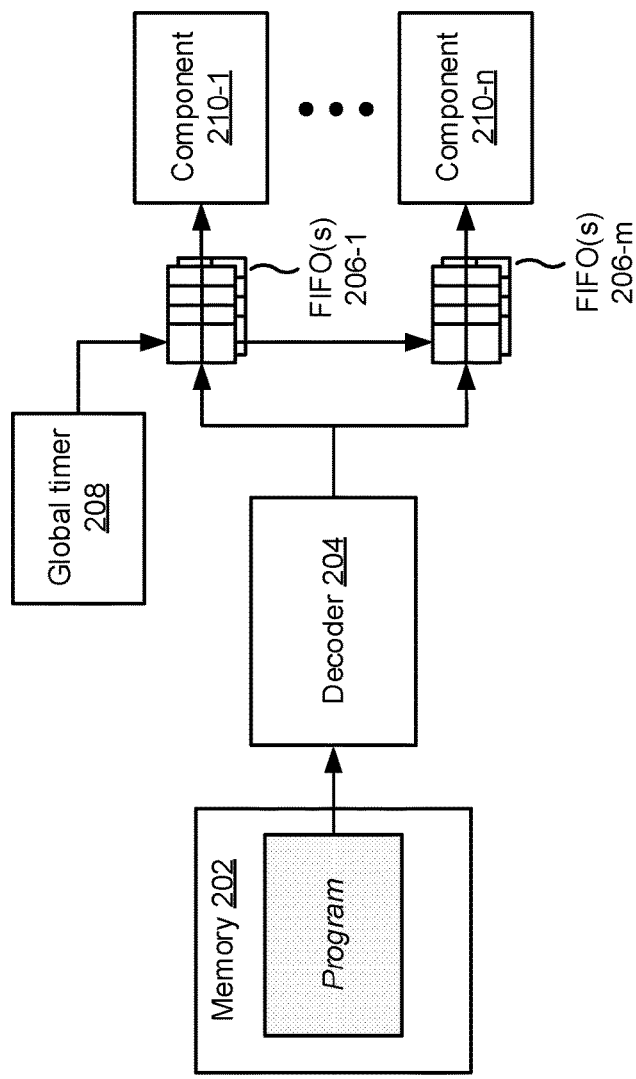
FIGS. 2A-2C are diagrams associated with a radar device in which sequencer functionality is split between a decoder and a set of first-in, first-out (FIFO) buffers, as described herein.
Figure 2B:
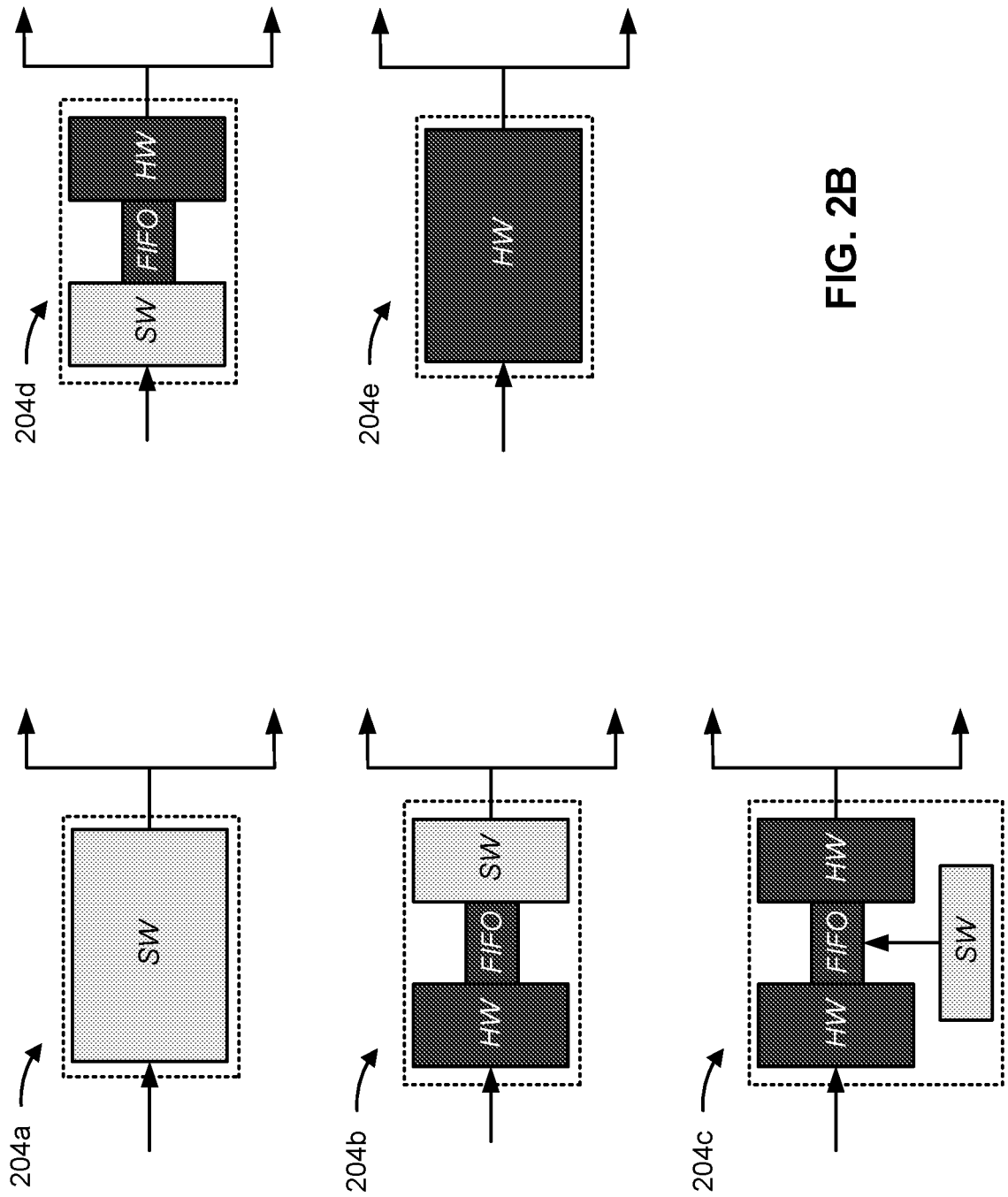
Figure 2C:
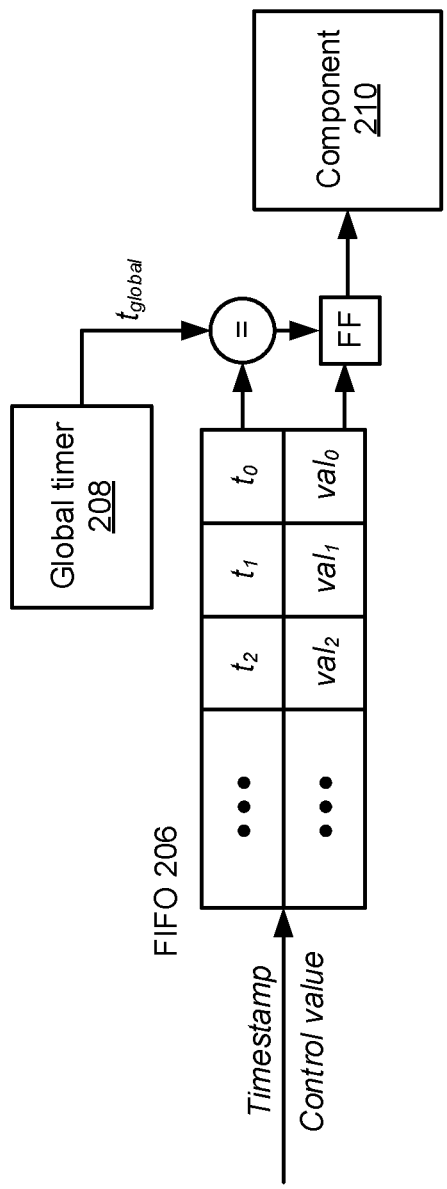

FIGS. 2A-2C are diagrams associated with a radar device 200 in which sequencer functionality is split between a decoder and a set of FIFO buffers, as described herein. As shown in FIG. 2A, the radar device 200 may include a memory 202, a decoder 204, a set of FIFO buffers 206 (e.g., FIFO buffers 206-1 through 206-m (m>1)), and a set of components 210 (e.g., components 210-1 through 210-n (n>1). In some implementations, the radar device 200 is included in a radar system associated with generating, transmitting, and/or receiving radar signals. In some implementations, the radar device 200 is implemented on a single integrated circuit. Alternatively, in some implementations, the radar device 200 is implemented across two or more integrated circuits. For example, in some implementations, a first set of components of the radar device 200 may be implemented on a first integrated circuit, while a second set of components of the radar device 200 may be implemented on a second integrated circuit.

Memory 202 is a component to store a program (also referred to as a sequencer program) associated with operation of the radar device 200, as described herein. In some implementations, memory 202 may include, for example, a RAM, a read only memory (ROM), and/or another type of memory (e.g., a flash memory, a magnetic memory, and/or an optical memory). In some implementations, the program includes one or more opcodes based on which one or more components 210 of the radar device 200 are to operate (e.g., in association with transmitting or receiving a sequence of frequency ramps). In some implementations, the program is to be decoded by decoder 204 so that the decoder 204 can generate value pairs (e.g., a control value and associated timestamp) associated with controlling components 210 of the radar device 200, as described below.

Decoder 204 is a component to read the program from the memory 202 and to generate a value pair comprising a control value and a timestamp associated with the control value based at least in part on the program (e.g., by decoding the program). A control value is a value to be provided as an input to a component 210 of the radar device 200 at a time indicated by the timestamp associated with the control value. As shown in FIG. 2A, the decoder 204 may be configured such that the decoder 204 can provide at least the control value (and optionally the associated timestamp) to a FIFO buffer 206 associated with a component 210 to be controlled using the control value.

In some implementations, as described in further detail below, the use of the FIFO buffers 206 enables the decoder 204 to only need to fulfill soft real-time requirements. That is, as long as the decoder 204 can decode the program fast enough (relative to execution of the frequency ramp scenario) on average to generate value pairs, sufficiently large FIFO buffers 206 allow the radar device 200 to guarantee the hard real-time requirements. Here, because the decoder 204 needs only to fulfill soft real-time requirements, the decoder 204 can in some implementations be implemented at least partially in software.

One advantage of at least partial implementation of the decoder 204 in software is that any changes or bugs in components 210 can be fixed in the software. For example, in an example case a gain of a component 210 in the form of a power amplifier is programmed to change from 0 to a given value g at a particular point in time $t_g$. That is, in an example case the program requires a single value pair ($t_g$, g) to be pushed to the FIFO buffer 206 for the gain input of the power amplifier. Further, in this example case, due to a bug in the design, changing the gain of the power amplifier in one step causes a significant supply load step and is therefore should be avoided, if possible. In this case, the software of the decoder 204 that decodes the program could be used to insert a "ramping" of the gain by pushing several value pairs (e.g., $$\left(t_0, 1\frac{g}{4}\right), \left(t_1, 2\frac{g}{4}\right), \left(t_2, 3\frac{g}{4}\right), \text{ and } \left(t_3, 4\frac{g}{4}\right),$$

where a given value of $t_i$ could be before or after $t_g$. Notably, the program stored in memory 202 would be unaffected by this change.

Another advantage of at least partial implementation of the decoder 204 in software is that additional FIFO buffers 206 can be included in the radar device 200 for enabling additional configurations of the radar device 200. These additional configurations could be either inserted into previously unused or reserved parts of the program, or even derived from other given configurations. For example, assume a power amplifier of the radar device 200 has a bug that makes changing a gain impossible while the power amplifier is turned on. Here, if a FIFO buffer 206 is available for a signal used to enable/disable the power amplifier, then for each value pair ($t_i$, $g_i$) pushed to the FIFO buffer 206 associated with the gain of the power amplifier, the software can also push the value pairs ($t_i-\Delta t_1$, disabled) and ($t_i+\Delta t_2$, enabled) to the enable FIFO buffer 206, which could be used to disable the power amplifier by an amount of time $\Delta t$ before changing the gain, and to re-enable the power amplifier by an amount of time $\Delta t$ after changing the gain. Again, no changes to the program are necessary to provide such a configuration.

Thus, in some implementations, the decoder 204 is implemented at least partially in software. For example, in some implementations, the decoder 204 may be a software-based decoder (i.e., the decoder 204 may be implemented purely in software), an example of which is illustrated by reference 204a in FIG. 2B. As another example, in some implementations, the decoder 204 may be a combination of a software-based decoder and a hardware-based decoder (i.e., the decoder 204 may be implemented in both software and hardware), examples of which are illustrated by references 204b, 204c, and 204d in FIG. 2B. Notably, when the decoder 204 is implemented as a combination of a software-based decoder and a hardware-based decoder, the benefits of software (e.g., flexibility) and hardware (e.g., speed) may both be provided to some degree. Alternatively, in some implementations, the decoder 204 is a hardware-based decoder (i.e., the decoder 204 may be implemented purely in hardware), an example of which is illustrated by reference 204e in FIG. 2B. Notably, requirements of the decoder 204 are reduced when the decoder 204 is a hardware-based decoder, thereby allowing a comparatively more efficient hardware implementation (e.g., as compared to the monolithic implementation described above).

Returning to FIG. 2A, FIFO buffer 206 is a component (e.g., a FIFO-based buffer) to store at least a control value and to provide the control value as the input to the component 210 of the radar device 200 at a time indicated by a timestamp associated with the control value. That is, the FIFO buffer 206 is a component of the radar device 200 that holds control values to be provided to a component 210 of the radar device 200 and provides the control values to the component at appropriate times during operation of the radar device 200. In some implementations, the FIFO buffer 206 stores the control values and the associated timestamps as value pairs (e.g., such that a control value is associated with a corresponding timestamp within the FIFO buffer 206). Alternatively, in some implementations, the FIFO buffer 206 may store the control values only. For example, the FIFO buffer 206 may store the control values, and timestamps associated with the control values may be stored external to the FIFO buffer 206. In such a case, the radar device 200 may include a triggering component that stores timestamps associated with multiple FIFO buffers 206. Here, the triggering component may, upon determining that a value of the global timer 208 has reached a first timestamp, provide a trigger signal that causes one or more of the multiple FIFO buffers 206 to provide respective control values to their associated components 210. Such an implementation can be used to eliminate a need to store multiple instances of the same timestamp, thereby reducing an amount of memory needed in the radar device 200, meaning that a size and/or cost of the radar device 200 is reduced.

As shown in FIG. 2A, the radar device 200 may include one or more FIFO buffers 206 for each component 210 of the radar device 200. That is, the radar device 200 may include one or more FIFO buffers 206 for providing control values to a given component 210 of the radar device 200. Notably, in the radar device 200, the FIFO buffer 206 is the only component that needs to fulfill hard real-time requirements. That is, the FIFO buffer 206 needs to fulfill hard real-time requirements in terms of providing control values as inputs to components 210 in a cycle-accurate manner, but the decoder 204 does not need to fulfill hard real-time requirements when filling the FIFO buffers 206 with value pairs.

FIG. 2C is a diagram of an example associated with a FIFO buffer 206. As shown in FIG. 2C, each entry in the FIFO buffer 206 may be a value pair comprising a control value $val_i$ and an associated timestamp $t_i$ at which the control value $val_i$ should be provided to a given component 210. Here, the timestamps $t_i$ are cycle counts that are synchronized between all FIFO buffers 206 of the radar device 200 by the global timer 208. In operation, the FIFO buffer 206 can be filled in a way that ensures that $t_i > t_{(i-1)}$ for all i (i.e., such that the values for t are increasing). As further shown in FIG. 2C, a comparator (identified by the circle with the "=" sign) may be used to compare a value $t_{global}$ of the global timer 208 to the first value of $t_i$ within the FIFO buffer 206. When the value $t_{global}$ matches the first value of $t_i$ within the FIFO buffer 206, the first control value $val_i$ is latched into an output flip-flop (FF) and, as a result, is provided as an input of a component 210 connected to the FIFO buffer 206. Here, the value pair ($t_i$, $val_i$) can be removed from the FIFO buffer 206, making the next entry ($t_{(i+1)}$, $val_{(i+1)}$) the first entry in the FIFO buffer 206. The next control value val Ho will be latched into the FF (and thereby be provided as the input to the component 210) upon the value $t_{global}$ reaching $t_{(i+1)}$.

The use of the FIFO buffer 206 in this manner provides a number of advantages. One advantage is that the FIFO buffer 206 offers clear and intuitive interfaces that allow the FIFO buffers 206 to be designed and implemented in parallel to the design and implementation of the decoder 204. Another advantage is that the FIFO buffer 206 is a regular structure and, therefore, can be easily replicated for all inputs that need to be controlled in a cycle-accurate manner. This simplifies development of a functionally safe radar device because safety mechanisms can be implemented for the FIFO buffer 206 and can be easily scaled for all FIFO buffers 206. Still another advantage is that the use of the FIFO buffer 206 alleviates the decoder 204 from being required to fulfill hard real-time requirements. Instead, the decoder 204 has to satisfy soft real-time requirements only. That is, the decoder 204 has to be fast enough to guarantee only that no value pair is pushed into the FIFO buffer 206 at a time where the value of the global timer 208 is greater than a timestamp included in the value pair. In other words, due to the use of the FIFO buffer 206, the decoder 204 has to guarantee only that a pair ($t_i$, $val_i$) is pushed into the FIFO buffer 206 at a point in time before $t_i$. This is in contrast to the conventional monolithic sequencing block, where a given value pair ($t_i$, $val_i$) needs to be made available at the output of the sequencing block at the exact time that the control value is to be provided as the input to component 210 (not before or after). Further, the use of the FIFO buffers 206 enables delayed control values (both positive and negative delayed control values) to be easily managed. For example, for the FIFO buffer 206 for which the output should be delayed by time $\Delta t$, the decoder 204 may provide a value pair comprising ($t_i+\Delta t$, $val_i$) to the FIFO buffer 206.

The global timer 208 is a component to maintain a cycle count in the radar device 200. In some implementations, a value of the global timer 208 may be used by a FIFO buffer 206 to trigger the FIFO buffer 206 to provide a control value to a component 210 of the radar device 200, as described herein. In some implementations, the global timer 208 may be a software-based timer, a hardware-based timer, or a combination of a software-based timer and a hardware-based timer. In some implementations, the radar device 200 may include a set of local timers (e.g., rather than including the global timer 208), where each local timer in the set of local timers is associated with a respective FIFO buffer 206 of the radar device 200, and the local timers in the set of local timers are synchronized.

Component 210 is a component of the radar device 200 that is to be controlled based at least in part on the program (e.g., the program defined by opcodes associated with operating the radar device 200) that is stored by memory 202. Component 210 may include, for example, a phase-locked loop (PLL) of the radar device 200, a component of a channel of the radar device 200 (e.g., a TX channel or an RX channel), such as a power amplifier, an ADC, a monitoring component, or another type of component associated with operation of the radar device 200 with respect to generating, transmitting, or receiving a radar signal.

Notably, neither the program stored in the memory 202 nor the components 210 are changed as compared to a radar device including the monolithic sequencing block. This means that the decoder 204, the FIFO buffers 206, and the global timer 208 may in some cases be a drop-in replacement for the monolithic sequencing block, thereby reducing effort required by a manufacturer (e.g., for integrating the decoder 204, the FIFO buffers 206, and the global timer 208 within a radar circuit) and a customer (e.g., for developing the program).

As indicated above, FIGS. 2A-2C are provided as examples. Other examples may differ from what is described with regard to FIGS. 2A-2C. The number and arrangement of components shown in FIGS. 2A-2C are provided as an example. In practice, there may be additional components, fewer components, different components, or differently arranged components than those shown in FIGS. 2A-2C. Furthermore, two or more components shown in FIGS. 2A-2C may be implemented within a single component, or a single component shown in FIGS. 2A-2C may be implemented as multiple, distributed components. Additionally, or alternatively, a set of components (e.g., one or more components) shown in FIGS. 2A-2C may perform one or more functions described as being performed by another set of components shown in FIGS. 2A-2C.

FIGS. 3A-3H are diagrams of an example 300 illustrating operation of the radar device 200. A frequency ramp scenario associated with the example 300 is shown in the top portion of each of FIGS. 3A-3H. As shown, for each frequency ramp, a signal associated with enabling/disabling a component 210 of the radar device 200 is to cause the component 210 to be enabled at a start of each frequency ramp (e.g., at times 10 and 110) and is to cause the component 210 to be disabled at an end of each frequency ramp (e.g., at times 100 and 200). Here, the program stored by memory 202 may include opcodes that define this frequency ramp scenario.

Figure 3A:
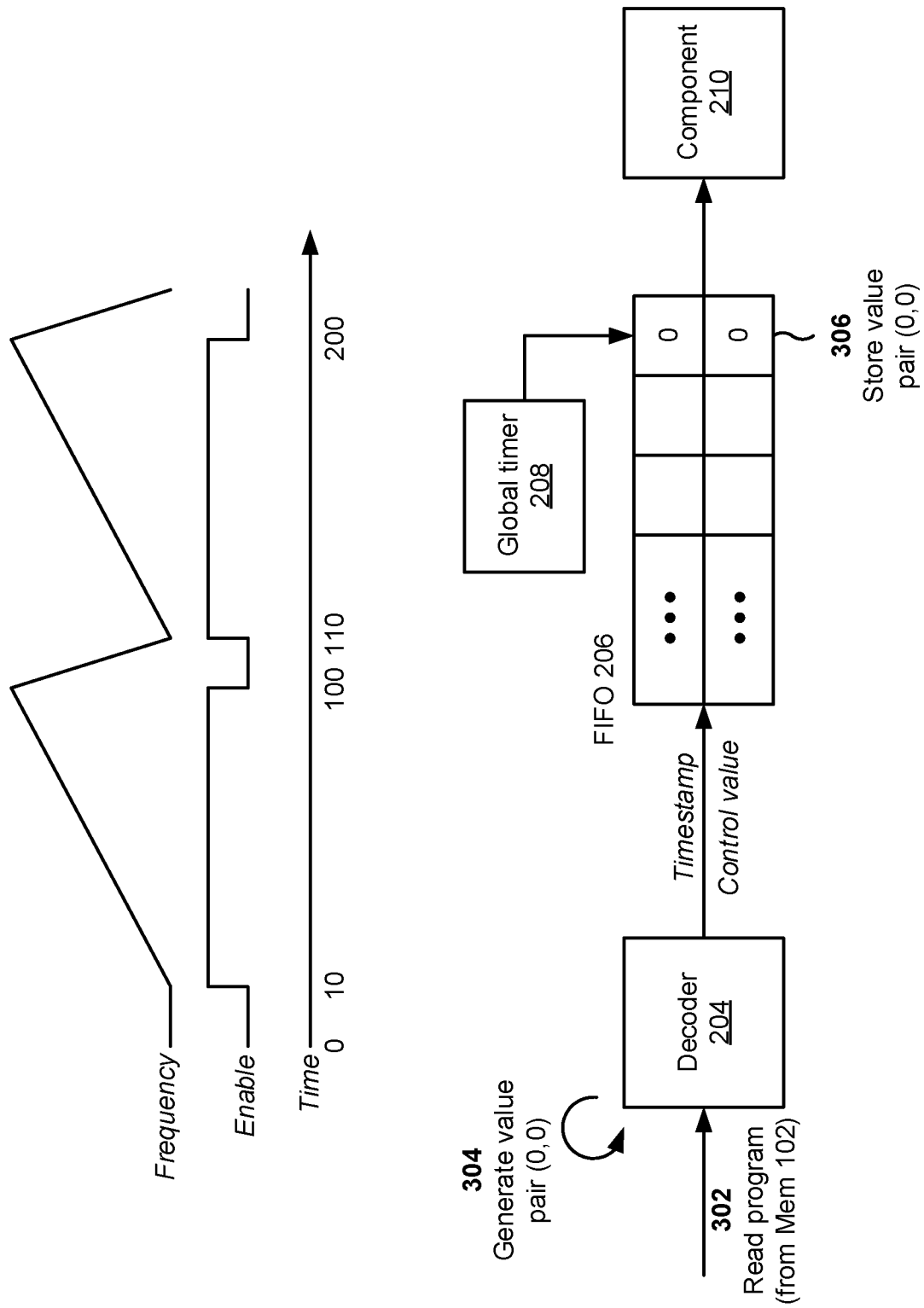
FIGS. 3A-3H are diagrams illustrating an example operation of the radar device shown in FIGS. 2A-2C.
Figure 3B:
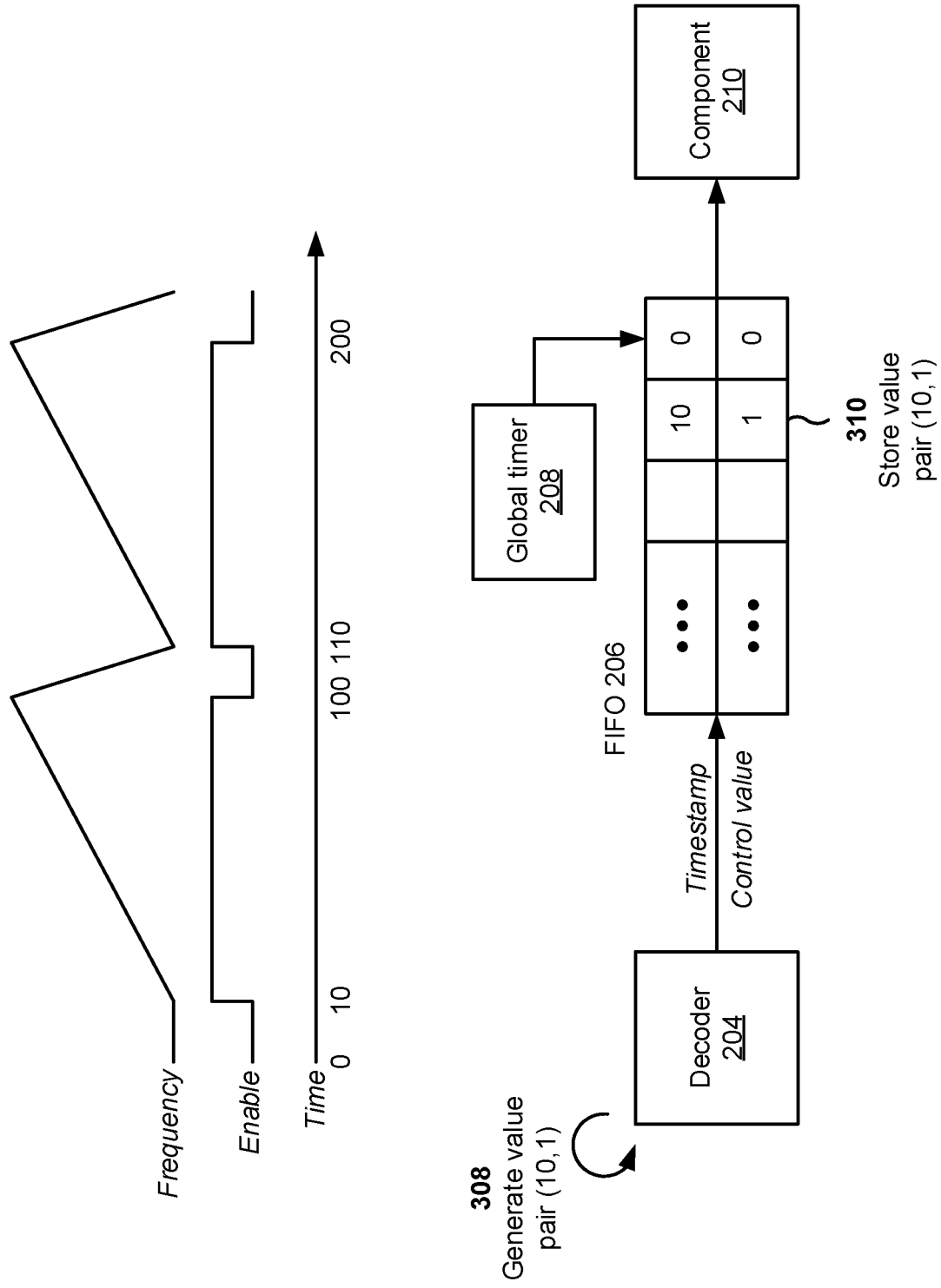
Figure 3C:
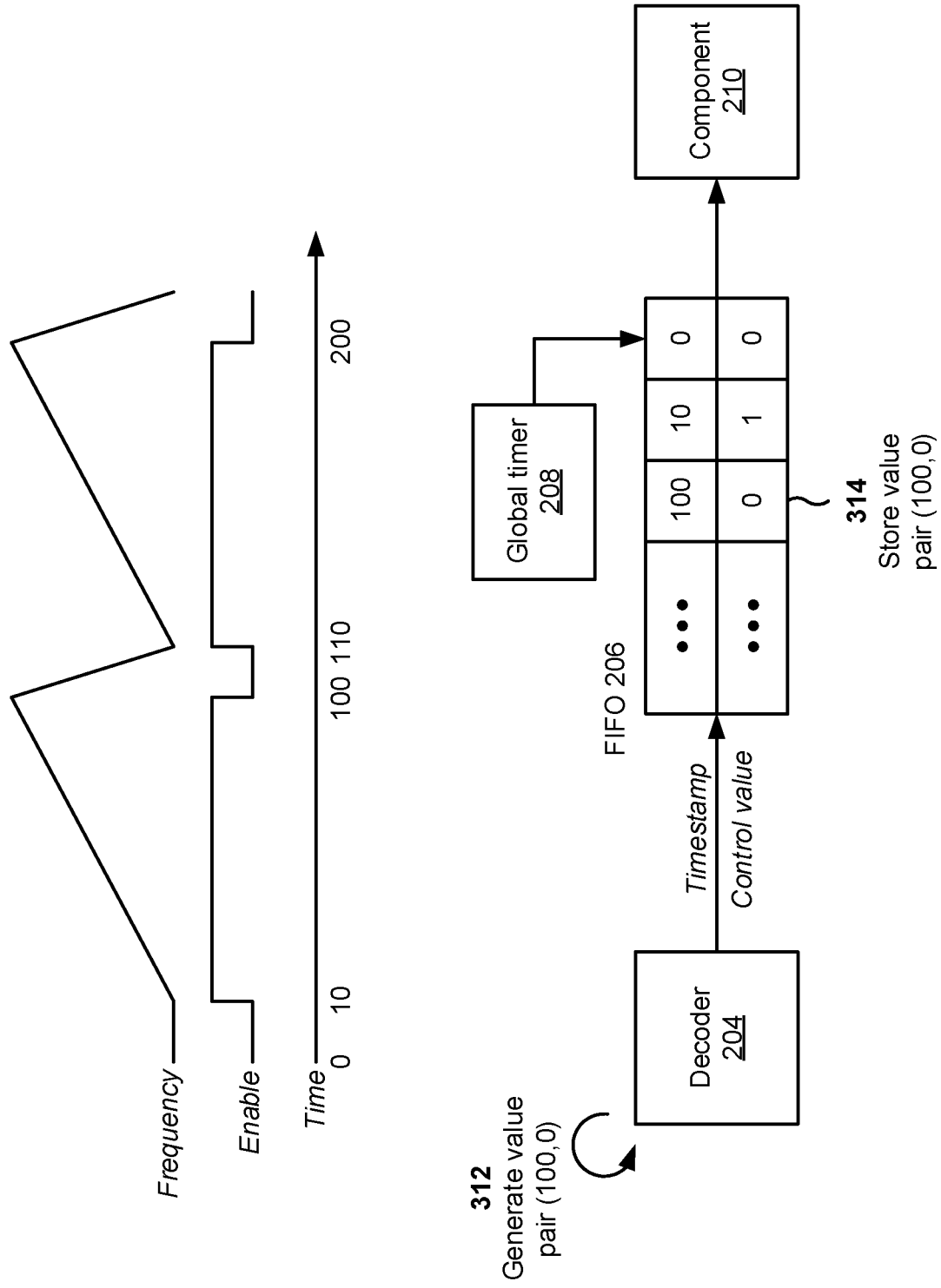

FIGS. 3A-3C illustrate a setup phase performed by the radar device 200 in association with executing with the frequency ramp scenario. The setup phase is a phase performed prior to execution of the frequency ramp scenario. In some implementations, the time at which the setup phase begins may be triggered by software of the decoder 204.

As shown by reference 302 in FIG. 3A, the decoder 204 first reads the program associated with the frequency ramp scenario from memory 202. In some implementations, the decoder 204 may read the entire program to begin execution, or may read a portion of the program to begin execution of the program (i.e., the decoder 204 can ready the program on the fly). As shown by reference 304, the decoder 204 generates a first control value (0) and a first timestamp (0) associated with the first control value based at least in part on the program. Here, the value pair indicates that at time t=0, the control value val provided to the component 210 should be 0 (such that the component 210 is disabled at time t=0). As shown by reference 306, a FIFO buffer 206 associated with the component 210 (e.g., a FIFO buffer 206 associated with controlling the signal associated with enabling/disabling the component 210) stores the first control value and the first timestamp as a first value pair in the FIFO buffer 206.

As shown by reference 308 in FIG. 3B, the decoder 204 next generates a second control value (1) and a second timestamp (10) associated with the second control value based at least in part on the program. Here, the value pair indicates that at time t=10, the control value val provided to the component 210 should be 1 (such that the component 210 is enabled at time t=10). As shown by reference 310, the FIFO buffer 206 stores the second control value and the second timestamp as a second value pair in the FIFO buffer 206.

As shown by reference 312 in FIG. 3C, the decoder 204 next generates a third control value (0) and a third timestamp (100) associated with the third control value based at least in part on the program. Here, the value pair indicates that at time t=100, the control value val provided to the component 210 should be 0 (such that the component 210 is disabled at time t=100). As shown by reference 314, the FIFO buffer 206 stores the third control value and the third timestamp as a third value pair in the FIFO buffer 206.

FIGS. 3D-3H illustrate an execution phase associated with the frequency ramp scenario. In some implementations, the time at which the execution phase begins may be triggered by an event (e.g., upon the FIFO buffer 206 being filled to a particular degree) and/or by software of the decoder 204.

Figure 3D:
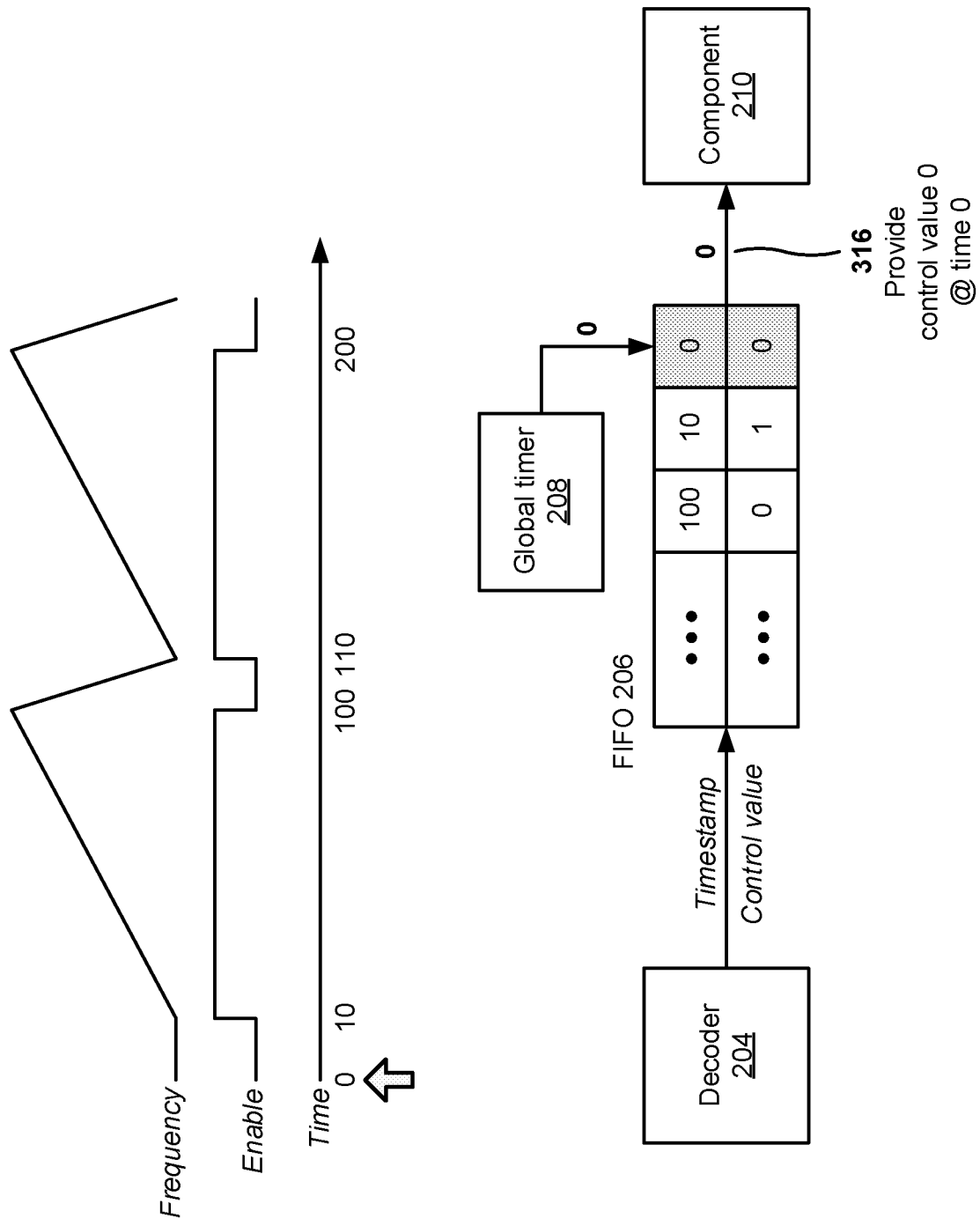

As shown by reference 316 in FIG. 3D, the FIFO buffer 206 provides the first control value as an input to the component 210 at the time indicated by the first timestamp. For example, the FIFO buffer 206 may determine that a time indicated by the global timer 208 matches the time indicated by the first timestamp (e.g., that the time indicated by the global timer 208 is 0) and, based on this determination, may provide the first control value (e.g., 0) as the input to the component 210. Here, the first value pair is removed from the FIFO buffer 206 upon the first control value being provided to the component 210.

Figure 3E:
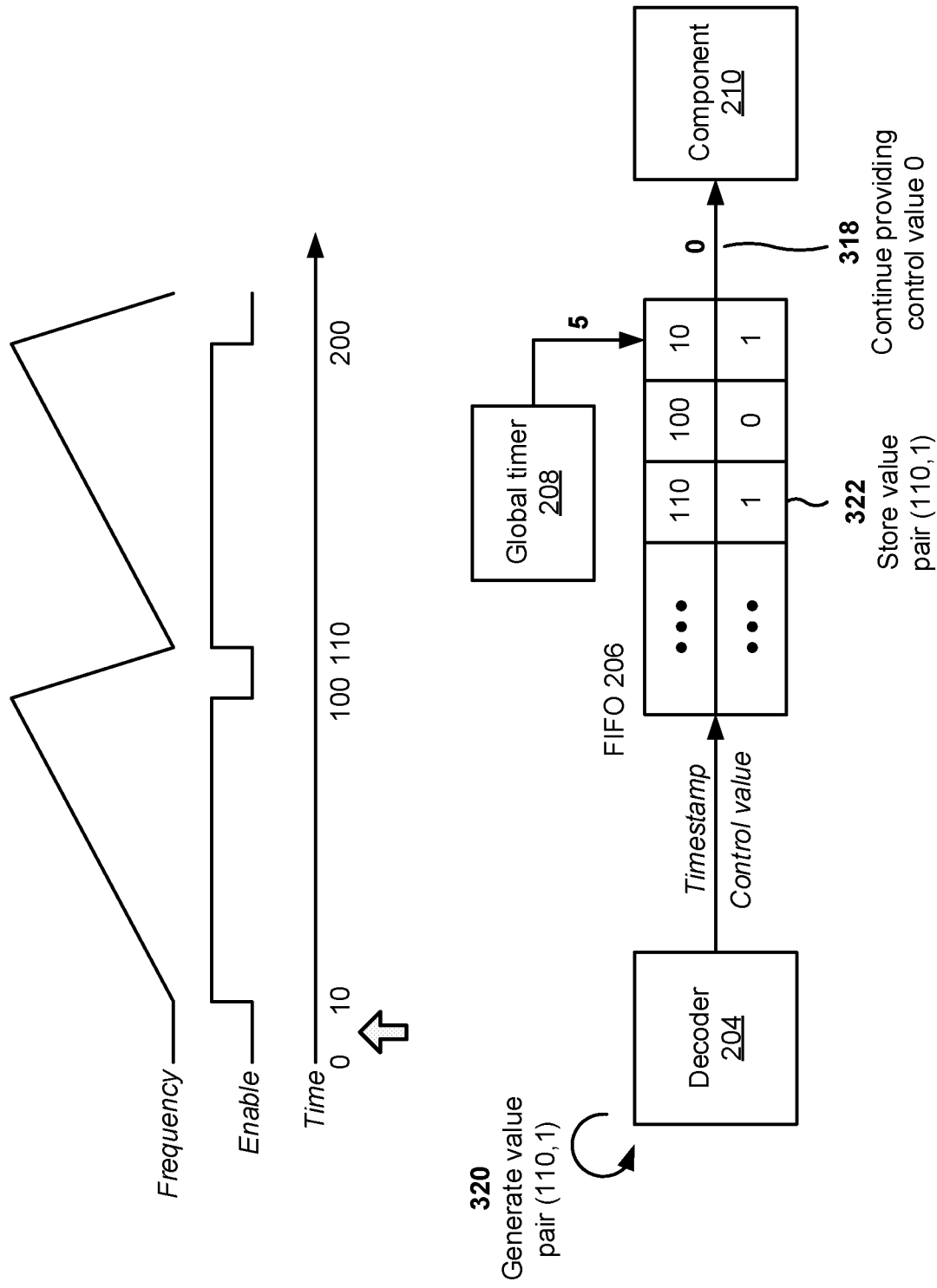

As shown by reference 318 in FIG. 3E, the FIFO buffer 206 may continue providing the first control value as the input to the component 210 at times between the first timestamp and the second timestamp (e.g., during a period of time between the first timestamp and the second timestamp). Thus at, for example, time t=5, the FIFO buffer 206 still provides the first control value as the input to the component 210 (e.g., such that the component 210 remains disabled). As further shown in FIG. 3E by reference 320, the decoder 204 may generate a fourth control value (1) and a fourth timestamp (110) associated with the fourth control value based at least in part on the program. Here, the value pair indicates that at time t=110, the control value val provided to the component 210 should be 1 (such that the component 210 is enabled at time t=110). As shown by reference 322, the FIFO buffer 206 stores the fourth control value and the fourth timestamp as a fourth value pair in the FIFO buffer 206. In some implementations, the decoder 204 may be triggered to generate the fourth control value after an amount of time during the execution phase, based on an indication that the FIFO buffer 206 is filled at or below a certain degree, or the like.

Figure 3F:
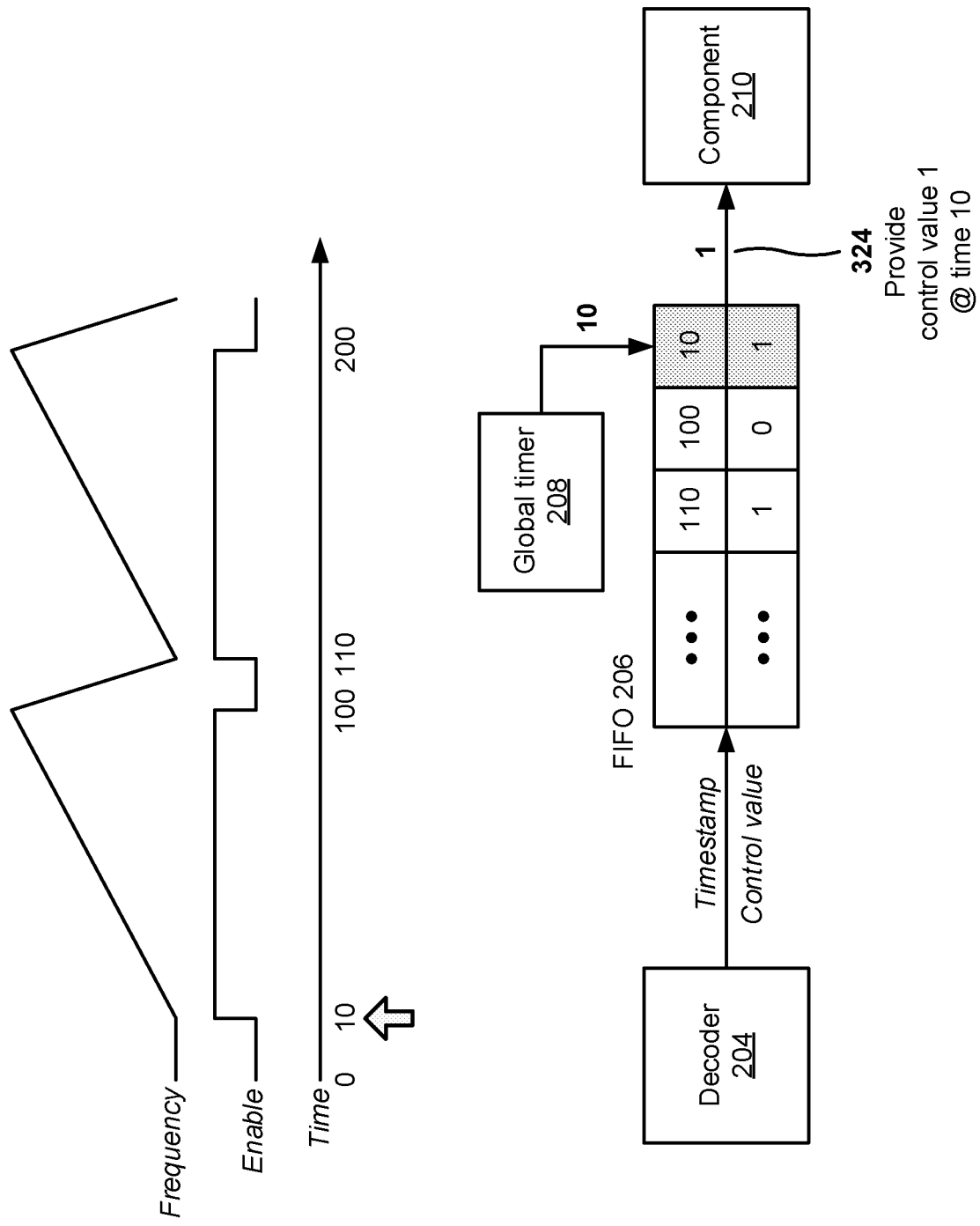

As shown by reference 324 in FIG. 3F, the FIFO buffer 206 provides the second control value as an input to the component 210 at the time indicated by the second timestamp. For example, the FIFO buffer 206 may determine that a time indicated by the global timer 208 matches the time indicated by the second timestamp (e.g., that the time indicated by the global timer 208 is 10) and, based on this determination, may provide the second control value (e.g., 1) as the input to the component 210. Here, the second value pair is removed from the FIFO buffer 206 upon the second control value being provided to the component 210.

Figure 3G:
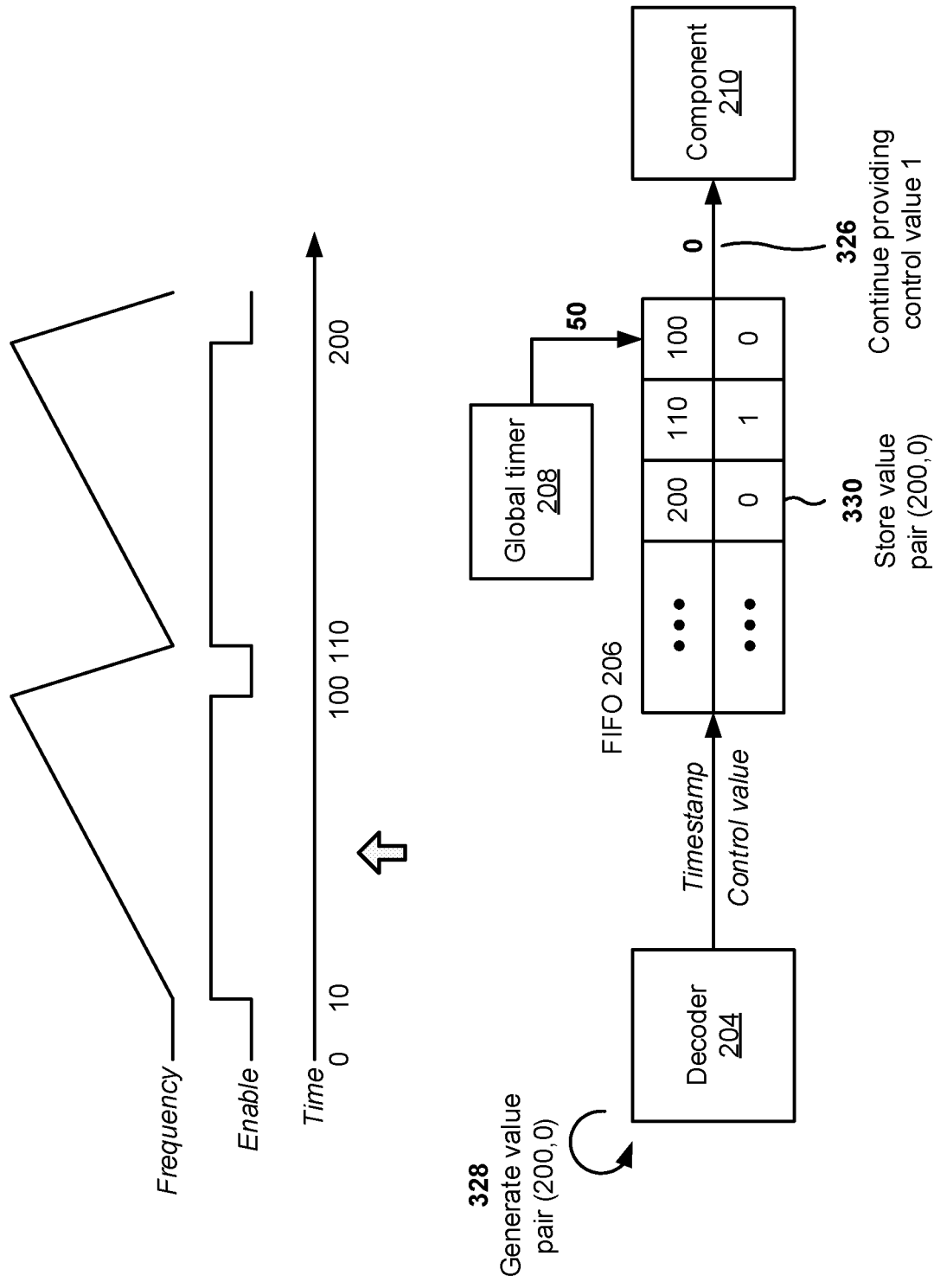

As shown by reference 326 in FIG. 3G, the FIFO buffer 206 may continue providing the second control value as the input to the component 210 at times between the second timestamp and the third timestamp (e.g., during a period of time between the second timestamp and the third timestamp). Thus at, for example, time t=50, the FIFO buffer 206 still provides the second control value as the input to the component 210 (e.g., such that the component 210 remains enabled). As further shown in FIG. 3G by reference 328, the decoder 204 may generate a fifth control value (0) and a fifth timestamp (200) associated with the fifth control value based at least in part on the program. Here, the value pair indicates that at time t=200, the control value val provided to the component 210 should be 0 (such that the component 210 is disabled at time t=200). As shown by reference 330, the FIFO buffer 206 stores the fifth control value and the fifth timestamp as a fifth value pair in the FIFO buffer 206.

Figure 3H:
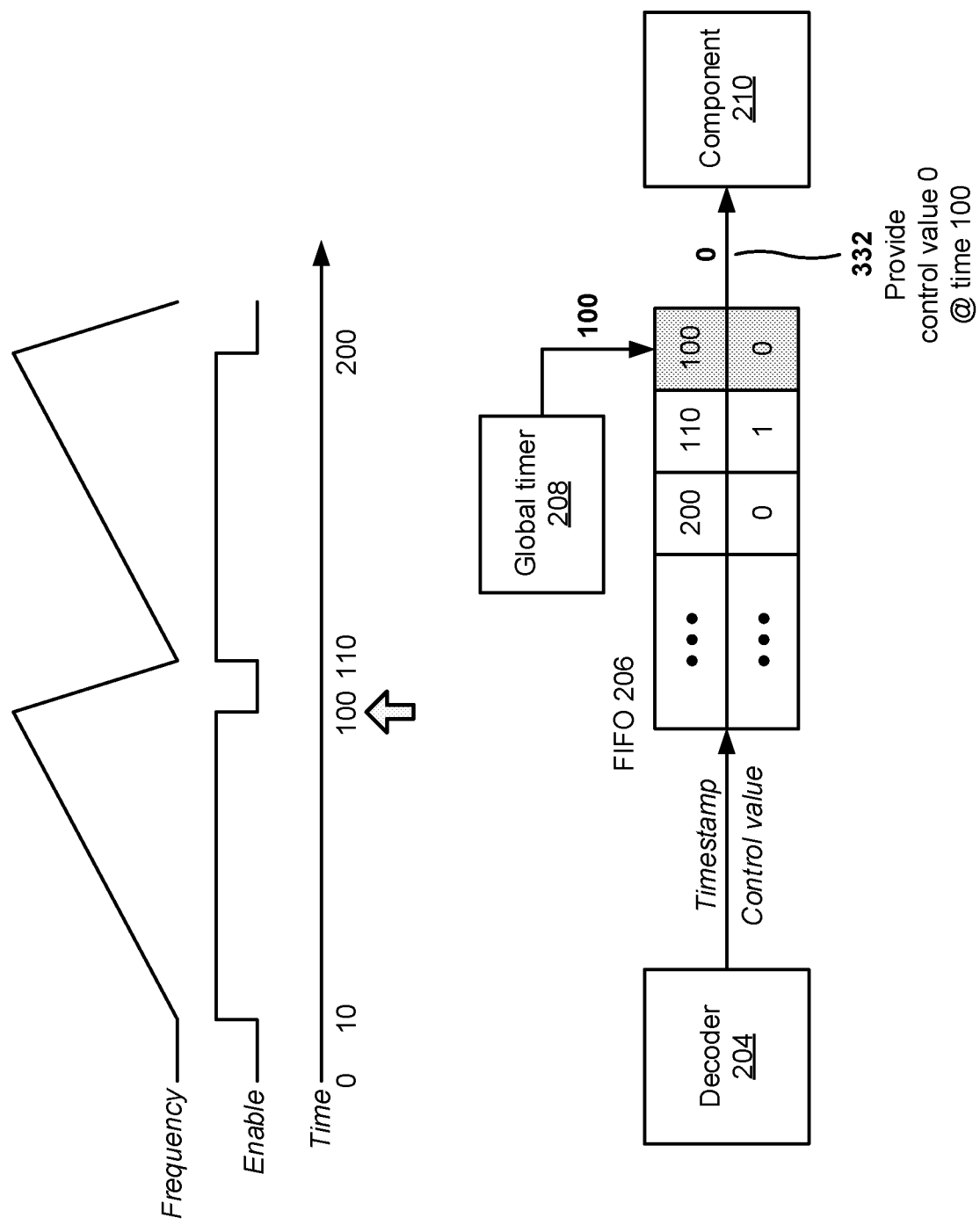

As shown by reference 332 in FIG. 3H, the FIFO buffer 206 provides the third control value as an input to the component 210 at the time indicated by the third timestamp. For example, the FIFO buffer 206 may determine that a time indicated by the global timer 208 matches the time indicated by the third timestamp (e.g., that the time indicated by the global timer 208 is 100) and, based on this determination, may provide the third control value (e.g., 0) as the input to the component 210. Here, the third value pair is removed from the FIFO buffer 206 upon the third control value being provided to the component 210. The execution phase associated with the frequency ramp scenario may continue in this manner until completion of the frequency ramp scenario.

Notably, operations similar to the described in association with FIGS. 3A-3H can be performed in parallel for one or more other FIFO buffers 206 of the radar device 200 during the same period of time. For example, the decoder 204 may generate sixth control value and a sixth timestamp based at least in part on the program, where the sixth control value is a value to be provided as an input to a second component 210 of the radar device 200 at a time indicated by the sixth timestamp. The decoder 204 may generate this sixth value pair before, after, or concurrent with an operation described as being performed by the decoder 204 in the example shown in FIGS. 3A-3H. Here, a second FIFO buffer 206 (e.g., a FIFO buffer 206 associated with the second component 210 of the radar device 200) may store the sixth control value and provide the sixth control value as the input to the second component 210 at the time indicated by the sixth timestamp in a manner similar to that described above with respect to FIGS. 3A-3H. Notably, in some scenarios, the time indicated by the sixth timestamp may match a time indicated by any one of the first through fifth timestamps associated with the first component 210, but the sixth control value and the sixth timestamp may be generated at a different time (e.g., before or after) the decoder 204 generates the control value with the matching timestamp. In this way, values for controlling different components 210 at the same time can be generated at different times (i.e., the decoder 204 does not need to concurrently provide inputs for controlling the different components 210 at the same time).

As indicated above, FIGS. 3A-3H are provided as an example. Other examples may differ from what is described with regard to FIGS. 3A-3H. The number and arrangement of components shown in FIGS. 3A-3H are provided as an example. In practice, there may be additional components, fewer components, different components, or differently arranged components than those shown in FIGS. 3A-3H. Furthermore, two or more components shown in FIGS. 3A-3H may be implemented within a single component, or a single component shown in FIGS. 3A-3H may be implemented as multiple, distributed components. Additionally, or alternatively, a set of components (e.g., one or more components) shown in FIGS. 3A-3H may perform one or more functions described as being performed by another set of components shown in FIGS. 3A-3H.

Figure 4:
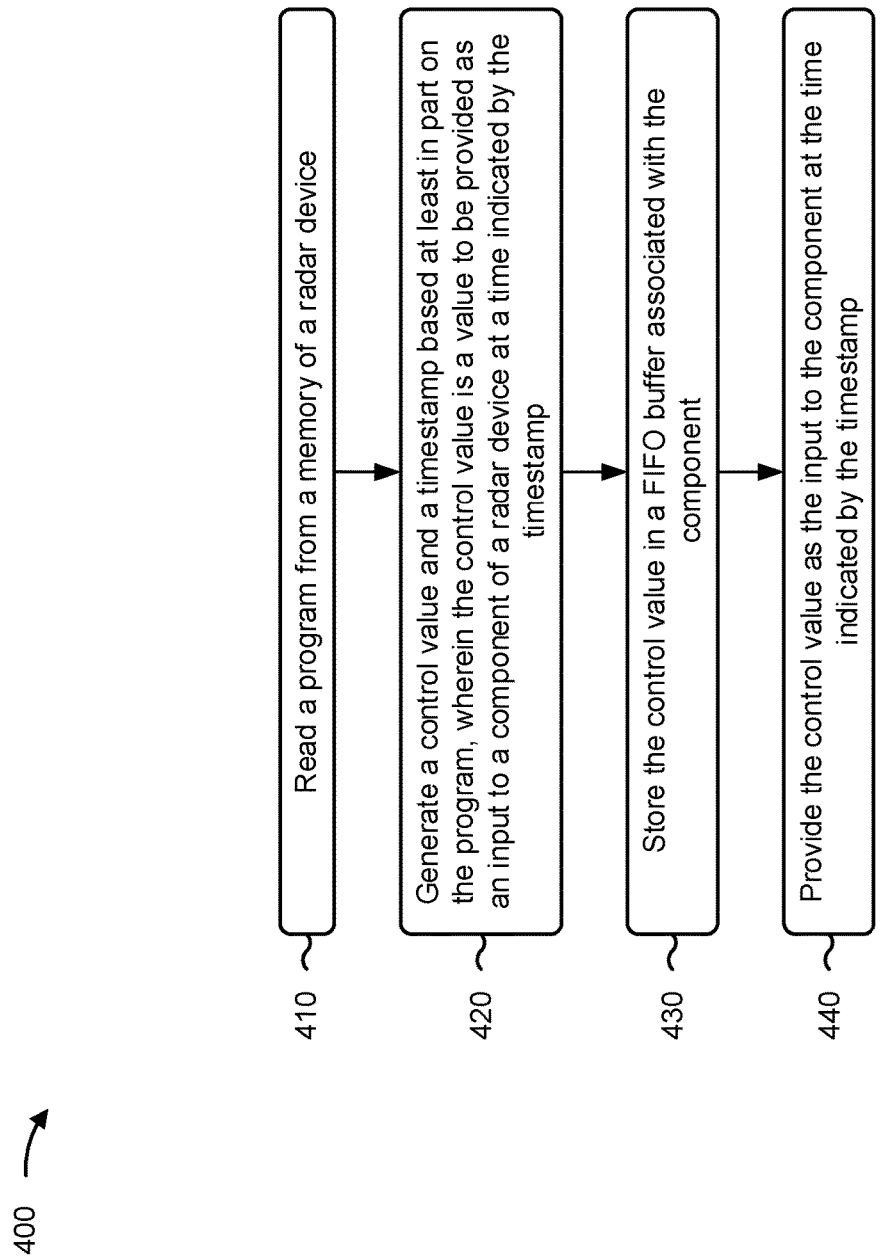
FIG. 4 is a flowchart of an example process relating to the operation of the radar device shown in FIGS. 2A-2C.

FIG. 4 is a flowchart of an example process 400 of an example operation of a radar device in which sequencer functionality is split between a decoder and a set of FIFO buffers, as described herein. In some implementations, one or more process blocks of FIG. 4 may be performed by one or more components of a radar device (e.g., radar device 200). For example, in some implementations, one or more process blocks of FIG. 4 may be performed by a decoder (e.g., a decoder 204), a FIFO buffer (e.g., FIFO buffer 206), and/or another component the radar device.

As shown in FIG. 4, process 400 may include reading a program from a memory of a radar device (block 410). For example, the decoder may read a program (e.g., program 104) from a memory (e.g., memory 202) of the radar device, as described above.

As further shown in FIG. 4, process 400 may include generating a control value and a timestamp based at least in part on the program, wherein the control value is a value to be provided as an input to a component of a radar device at a time indicated by the timestamp (block 420). For example, the decoder may generate a control value and a timestamp based at least in part on the program, wherein the control value is a value to be provided as an input to a component (e.g., component 210) of the radar device at a time indicated by the timestamp, as described above.

As further shown in FIG. 4, process 400 may include storing the control value in a FIFO buffer associated with the component (block 430). For example, the decoder may store the control value in a FIFO buffer (e.g., FIFO buffer 206) associated with the component, as described above.

As further shown in FIG. 4, process 400 may include providing the control value as the input to the component at the time indicated by the timestamp (block 440). For example, the FIFO buffer may provide the control value as the input to the component at the time indicated by the timestamp, as described above.

Process 400 may include additional implementations, such as any single implementation or any combination of implementations described below and/or in connection with one or more other processes described elsewhere herein.

In a first implementation, providing the control value comprises determining that a time indicated by a global timer (e.g., global timer 208) of the radar device matches the time indicated by the timestamp, and providing the control value to the component based on the determination that the time indicated by the global timer matches the time indicated by the timestamp.

In a second implementation, alone or in combination with the first implementation, process 400 includes storing the timestamp in the FIFO buffer such that the timestamp is associated with the control value.

In a third implementation, alone or in combination with one or more of the first and second implementations, a decoder associated with generating the control value and the timestamp is one of a software-based decoder, a hardware-based decoder, or a combination of a software-based decoder and a hardware-based decoder.

In a fourth implementation, alone or in combination with one or more of the first through third implementations, the control value is a first control value, the timestamp is a first timestamp, and process 400 includes generating a second control value and a second timestamp based at least in part on the program, wherein the second control value is a value to be provided as the input to the component of the radar device at a time indicated by the second timestamp, storing the second control value in the FIFO buffer associated with the component, and providing the second control value as the input to the component of the radar device at the time indicated by the second timestamp.

In a fifth implementation, alone or in combination with one or more of the first through fourth implementations, the control value is a first control value, the timestamp is a first timestamp, the component is a first component, and the FIFO buffer is a first FIFO buffer, and process 400 further includes generating a second control value and a second timestamp based at least in part on the program, wherein the second control value is a value to be provided as an input to a second component (e.g., a second component 210) of the radar device at a time indicated by the second timestamp, storing the second control value in a second FIFO buffer associated with the second component, and providing the second control value as the input to the second component at the time indicated by the second timestamp.

In a sixth implementation, alone or in combination with one or more of the first through fifth implementations, the time indicated by the second timestamp matches the time indicated by the first timestamp, and the second control value and the second timestamp are generated after the first control value and the first timestamp are generated.

In a seventh implementation, alone or in combination with one or more of the first through sixth implementations, the radar device is implemented on a single integrated circuit or is implemented across multiple integrated circuits.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radar device, comprising:
   a memory to store a program associated with operating the radar device;
   a global timer to maintain a cycle count of digital clock cycles;
   a set of radar components that are used in at least one of a transmit channel of the radar device for transmitting radar signals or a receive channel for receiving radar signals;
   a decoder to:
      read the program from the memory, and
      decode the program to generate for each radar component of the set of radar components a control value and a timestamp associated with the control value based at least in part on the program,
         wherein the control value is a value to be provided as an input to a respective radar component in accordance with a changing configuration during operation of the radar device at a time indicated by the timestamp,
         wherein the timestamp indicates a cycle count; and
   a set of first-in first-out (FIFO) buffers, wherein each FIFO buffer is configured to:
      store at least the control value and the timestamp of the respective radar component, and
      provide the control value as the input to the respective radar component at the time indicated by the timestamp.

2. The radar device of claim 1, wherein each FIFO buffer, when providing the control value, is to:
   provide the control value to the respective radar component based on receiving a trigger signal.

3. The radar device of claim 1, wherein the decoder is one of:
   a software-based decoder,
   a hardware-based decoder, or
   a combination of a software-based decoder and a hardware-based decoder.

4. The radar device of claim 1, wherein, for each radar component, the control value is a first control value, the timestamp is a first timestamp, and wherein the decoder is further to:
   generate, for each radar component, a second control value and a second timestamp based at least in part on the program,
      wherein the second control value is a value to be provided as the input to the respective radar component at a time indicated by the second timestamp, and
   wherein each FIFO buffer is further to:
      store at least the second control value, and
      provide the second control value as the input to the respective radar component at the time indicated by the second timestamp.

5. The radar device of claim 4, wherein the time indicated by the second timestamp is different from the time indicated by the first timestamp.

6. The radar device of claim 4, wherein the time indicated by the second timestamp matches the time indicated by the first timestamp and the decoder generates the second control value and the second timestamp after the decoder generates the first control value and the first timestamp.

7. The radar device of claim 1, wherein the radar device is implemented on a single integrated circuit.

8. The radar device of claim 1, wherein a functionality associated with a sequencer is split between the decoder and the set of FIFO buffers.

9. A method, comprising:
   reading a program from a memory of a radar device,
      wherein the radar device comprises:
         the memory,
         a global timer to maintain a cycle count of digital clock cycles,
         a set of radar components that are used in at least one of a transmit channel of the radar device for transmitting radar signals or a receive channel for receiving radar signals,
         a decoder, and
         a set of first-in first-out (FIFO) buffers, wherein each FIFO buffer of the set of FIFO buffers is associated with a respective radar component of the set of radar components;
   decoding, by the decoder, the program;
   generating, based at least in part on the program and for each radar component of the set of radar components, a control value and a timestamp associated with the control value,
      wherein the control value is a value to be provided as an input to the respective radar component in accordance with a changing configuration during operation of the radar device at a time indicated by the timestamp, and
      wherein the timestamp indicates a cycle count;
   storing, by each FIFO buffer, at least the control value and the timestamp of the respective radar component; and
   providing, by each FIFO buffer, the control value as the input to the respective radar component at the time indicated by the timestamp.

10. The method of claim 9, wherein providing the control value comprises:
   providing the control value to the respective radar component based on receiving a trigger signal.

11. The method of claim 9, wherein the decoder is one of a software-based decoder, a hardware-based decoder, or a combination of a software-based decoder and a hardware-based decoder.

12. The method of claim 9, wherein the control value is a first control value, the timestamp is a first timestamp, and wherein the method further comprises:
generating, for each FIFO buffer, a second control value and a second timestamp based at least in part on the program,
wherein the second control value is a value to be provided as the input to the respective radar component at a time indicated by the second timestamp, and
storing, by each FIFO buffer, the second control value; and
providing, by each FIFO buffer, the second control value as the input to the respective radar component at the time indicated by the second timestamp.

13. The method of claim 12, wherein the time indicated by the second timestamp matches the time indicated by the first timestamp and the second control value and the second timestamp are generated after the first control value and the first timestamp are generated.

14. The method of claim 12, wherein the time indicated by the first timestamp is different from the time indicated by the second timestamp.

15. The method of claim 9, wherein the radar device is implemented across multiple integrated circuits.

16. A system, comprising:
a decoder to:
read, from a memory, a program associated with controlling radar operation of a set of components of the system, wherein the set of components are used in at least one of a transmit channel of the system for transmitting signals or a receive channel of the system for receiving signals,
decode the program to generate for each component of the set of components a control value and a timestamp associated with the control value based at least in part on the program,
wherein the control value is a value to be provided to a respective component of the set of components in accordance with a changing configuration during operation of the system at a time indicated by the timestamp,
wherein the timestamp indicates a cycle count of a global timer configured to maintain a cycle count of digital clock cycles that is associated with a start of the frequency ramp or an end of the frequency ramp; and
a set of first-in first-out (FIFO) buffers, wherein each FIFO buffer is configured to:
store at least the control value and the timestamp of the respective component of the system, and
provide the control value to the respective component at the time indicated by the timestamp.

17. The system of claim 16, wherein the control value is a first control value, the timestamp is a first timestamp, and wherein the decoder is further to:
generate, a component of the set of components of the system, a value pair based at least in part on a frequency ramp, the value pair including a second control value associated with the component and a second timestamp associated with the second control value,
wherein the time indicated by the first timestamp is associated with a start of the frequency ramp and a time indicated by the second timestamp is associated with an end of the frequency ramp.

18. The system of claim 16, wherein each FIFO buffer is further to:
receive a trigger signal at the time indicated by the timestamp, and
provide the control value to the respective component based on receiving the trigger signal.

19. The system of claim 16, wherein the decoder is one of a software-based decoder, a hardware-based decoder, or a combination of a software-based decoder and a hardware-based decoder.

20. The system of claim 16, wherein a functionality associated with a sequencer is split between the decoder and the set of FIFO buffers.

* * * * *